United States Patent [19]

Wordin

[11] Patent Number: 4,878,652
[45] Date of Patent: Nov. 7, 1989

[54] PLUG VALVE

[75] Inventor: John J. Wordin, Shelley, Id.

[73] Assignee: The United States of America as represented by the United States Department of Energy, Washington, D.C.

[21] Appl. No.: 861,383

[22] Filed: May 9, 1986

[51] Int. Cl.⁴ .......................... F16K 25/00; F16K 5/00
[52] U.S. Cl. ..................................... 251/181; 251/309; 251/314
[58] Field of Search ......................... 251/181, 309, 314

[56] References Cited

U.S. PATENT DOCUMENTS

| | | | |
|---|---|---|---|
| 131,799 | 10/1872 | Ureeland et al. | 251/181 |
| 3,038,694 | 6/1962 | Dunbeck | 251/309 X |
| 3,815,870 | 6/1974 | Milleville | 251/181 X |

Primary Examiner—Martin P. Schwadron
Attorney, Agent, or Firm—Helen S. Cordell; John M. Albrecht; Judson R. Hightower

[57] ABSTRACT

An improved plug valve wherein a novel shape for the valve plug and valve chamber provide mating surfaces for improved wear characteristics. The novel shape of the valve plug is a frustum of a body of revolution of a curved known as a tractrix, a solid shape otherwise known as a peudosphere.

4 Claims, 3 Drawing Sheets

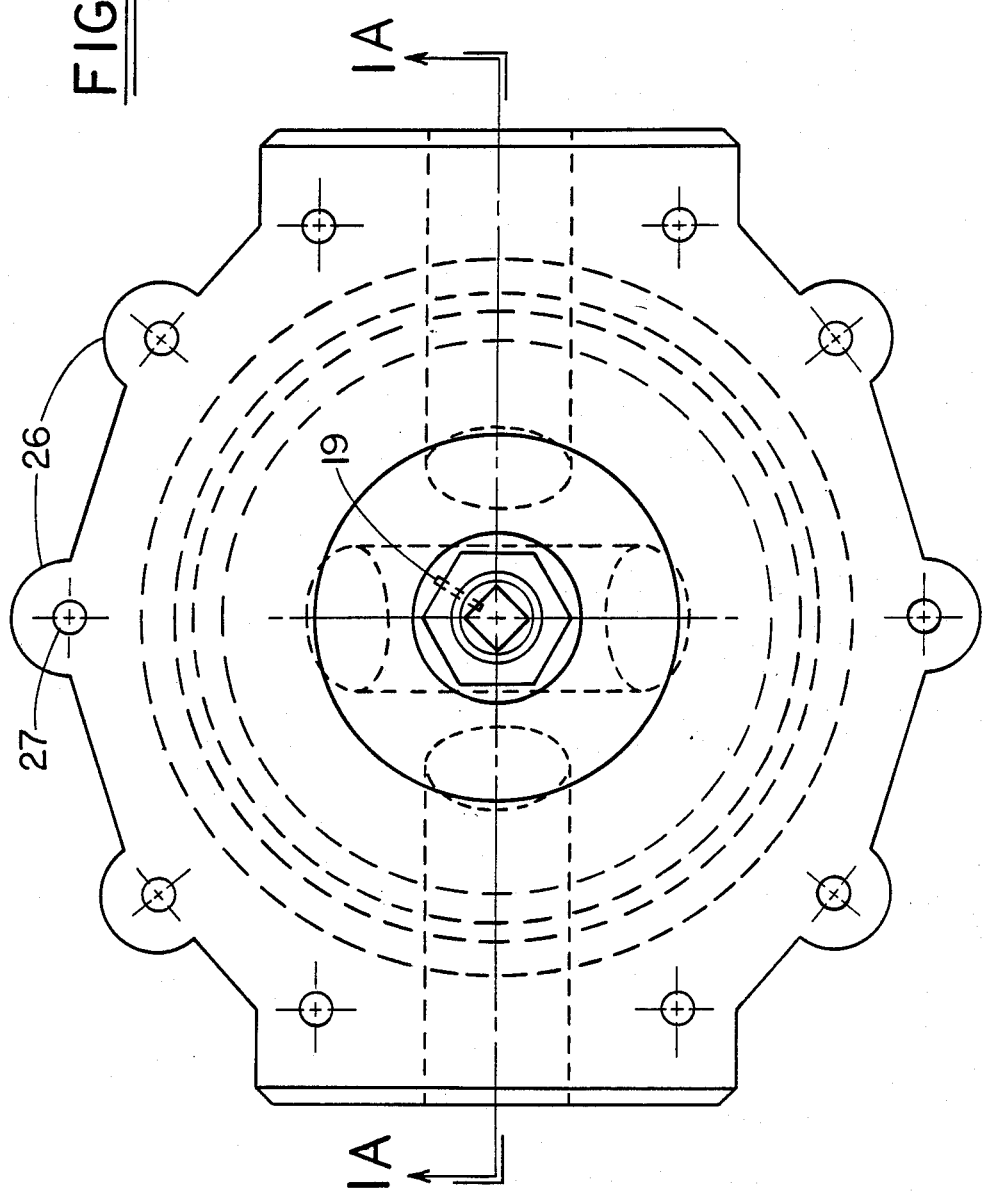

PLUG VALVE

CONTRACTUAL ORIGIN OF THE INVENTION

The United States Government has rights in this invention pursuant to Contract No. DE-AC07-79ID01675 between the U.S. Department of Energy and Exxon Nuclear Idaho Company, Inc.

BACKGROUND OF THE INVENTION

This invention relates to an improved plug valve, more particularly to a plug valve having a plug shaped so as to provide even wear between the engaging surfaces of the plug valve and valve body, thereby, maximizing the useful life of the valve.

A plug valve, sometimes referred to as a globe valve or a ball valve when the plug is so shaped, comprises a valve body with an inlet passage, an outlet passage and a valve chamber between the inlet and outlet passages. The valve chamber generally has the shape of a body of revolution such as a sphere, a cylinder, or the frustum of a cone, with its axis of rotation usually perpendicular to the inlet and outlet passages which are usually colinear. A valve plug shaped generally to conform to the shape of the valve chamber, is rotatably disposed within the chamber. The valve plug is generally a solid body with a flow passage therethrough. The flow passage is positioned such that when the valve plug is in an open position the flow passage is aligned to provide fluid communication between the inlet and outlet passages. When the valve plug is rotated to a closed position usually at a position 90° from the open position, the flow passage is not aligned with the inlet and outlet passages, and solid portions of the valve plug interrupt fluid communication therebetween. A complete practical plug valve also includes connecting means such as threads or flanges at the openings of the inlet and outlet passages so that the valve may be connected into a fluid pipeline or a conduit to provide control of fluid flow therein. A plug valve also includes rotating means so that the valve plug may be rotated between the open and closed positions. The rotating means usually is a valve stem extending through the valve body and sealed with packing in a manner well known in the art. The valve stem may be rotated manually, by electric or hydraulic means or automatically controlled.

Sealing between the valve plug and the valve body is accomplished either with elastomeric gaskets or by surface to surface pressure between the plug and the valve body. The present invention relates to a plug valve wherein sealing between the valve plug and the valve body is accomplished by surface to surface pressure.

Plug valves of the type described are often used in chemical process applications such as in nuclear fuel processing plants. In such plants, plug valves are used for cell wall block valves or they may be used in pipelines containing nitric acid, hydrofluoric acid, sulfuric acid or sodium-hydroxide. Also in such plants, plug valves are used as process control valves in connection with waste calcinators. In this application, plug valves are used to control the flow of slurries containing solid particulate matter. Especially in this latter application where such valves are operated several times per hour, the valves are subject to wearing between the mating surfaces of the valve plug and the valve body. Such wearing requires frequent maintenance and/or replacement of the valves or valve parts.

Accordingly, it is an object of the present invention to provide a plug valve with improved wear characteristics between the plug and the valve body. Additional objects, advantages and novel features of the invention will be set forth in part in the description which follows, and in part will become apparent to those skilled in the art upon examination of the following or may be learned by practice of the invention. The objects and advantages of the invention may be realized and obtained by means of the embodiments and combinations particularly pointed out in the appended claims.

SUMMARY OF THE INVENTION

To achieve the foregoing and other objects in accordance with the purpose of the present invention as embodied and broadly described herein, this invention may comprise a plug valve having a valve body with an inlet passage and an outlet passage and a valve chamber between said inlet and outlet passages. A valve plug having substantially the same shape as the valve chamber is rotatably disposed therein. The valve plug has a flow passage therethrough such that in an open position the flow passage provides fluid communication between said inlet passage and said outlet passage, and in a closed position said flow passage is oriented such that the valve plug prevents fluid communication between said inlet passage and said outlet passage. The valve plug and the valve chambers have the shape of a pseudosphere. A pseudosphere is a body of rotation of a curve known as a tractrix about an axis. This novel shape for a valve plug and mating valve chamber results in uniform wear due to the friction between the valve plug and the surface of the valve body that define the valve chamber. The uniform wear, in turn, results in a valve with a longer life and/or longer intervals between maintenance as compared to a plug valve in which the valve plug and valve chamber do not have the novel shape of the present invention.

BRIEF DESCRIPTION OF THE DRAWINGS

The accompanying drawings which are incorporated in and form a part of the specification illustrate the preferred embodiment of the present invention and together with the description serve to explain the principles of the invention.

FIG. 1b is a plan view of the improved valve.

DETAILED DESCRIPTION OF THE INVENTION

The following is a detailed description of the preferred embodiment of the invention. Other embodiments will be readily apparent to those skilled in the art.

Figure 1A:
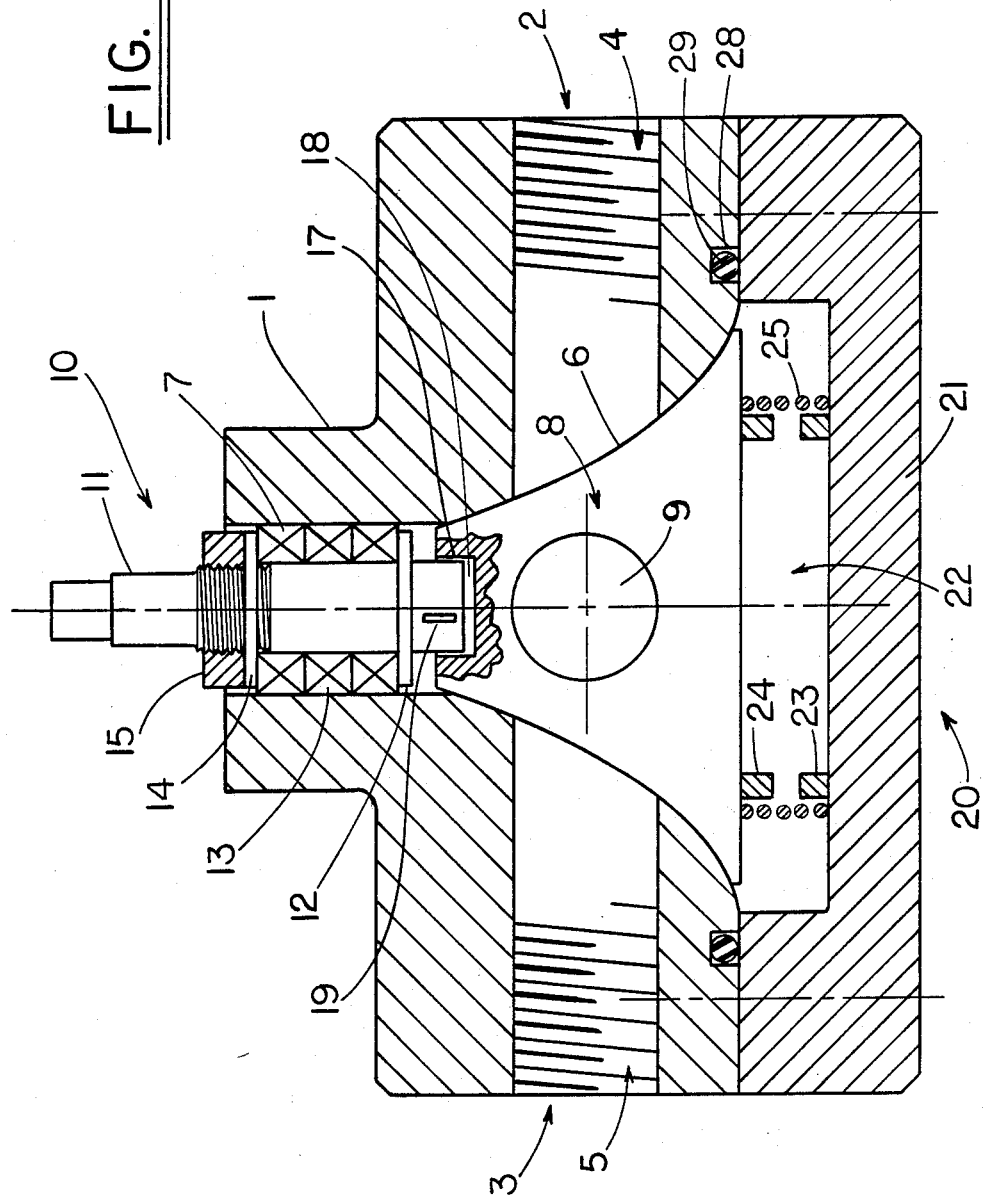
FIG. 1a is a sectional view of the improved plug valve.

FIG. 1a is a section drawing of the preferred embodiment. Valve body 1 is a casting, preferably of a stainless steel alloy such as Nitronic 60 TM, although other materials such as brass may be used, depending upon the particular application. Inlet passage 2 and outlet passage 3 are preferably colinear and circular in cross-section. It will be appreciated that inlet passage 2 and outlet passage 3 are identical and interchangable in the present valve and are so identified only for purposes of this description. In the present embodiment, pipe threads 4 and 5 are respectively provided at the exterior ends of the inlet and outlet passages for securing the valve in a fluid pipeline.

According to the present invention, the valve chamber 6 has the shape of a frustum of a body of revolution of a curve known as a tractrix. This solid shape is known as a pseudosphere. The valve chamber is machined in the valve body such that its axis is perpendicular to the axis of the inlet passage 2 and the outlet passage 3.

A valve stem opening 7 extends through the valve body from the valve chamber and is co-axial therewith.

The valve plug 8, having essentially the same shape as the valve chamber 6, is disposed within the valve chamber. The valve plug is preferably made of a material slightly softer than the material of the valve body. In this way, the primary wear will be in the plug which may be easily replaced after long periods of service. For example, where nitric acid resistant alloy Nitronic 60 TM is used for the valve body as suggested above, Nitronic 50 TM, a slightly softer alloy, may be used for the plugs. It will be appreciated that other combinations of materials, compatible with the intended application of the valve, may be used for the valve body and valve plug respectively.

The valve plug 8 has a flow passage 9 therethrough positioned such that when the valve plug is disposed within the valve chamber 6, the valve plug 8 may be rotated between a first position where the axis of the flow passage 9 is in alignment with colinear axes of the inlet and outlet passages and provides fluid communication therebetween, and a second position essentially 90° from the first position where the axis of the flow passage is not in alignment with the inlet and outlet passages and fluid communication therebetween is interrupted by the solid portions of the valve plug 8. As shown in FIG. 1a, the valve plug 8 is in the second or closed position.

The valve stem assembly 10 provides means to rotate the valve plug 8 within the valve chamber. The valve stem 11 may be attached to the valve plug by means of a keyed slip joint. The stem is coaxial with the plug extending through the valve stem opening. A cylindrical recess 17 in the top of the valve plug accepts the valve stem. When the valve plug is seated in the valve cavity a clearance space 18 at the bottom of the recess allows the valve plug to move deeper into the valve chamber as wear occurs. Fixed orientation with respect to rotation of the valve stem and valve plug is maintained by means of a key 19.

The valve stem 11 is smaller in diameter than the valve stem opening 7 to accommodate a sealing means. In the embodiment depicted in FIG. 1a the sealing around the valve stem is accomplished by valve stem packing readily familar to those skilled in the art. A retaining washer 12 is fixedly attached to the valve stem preferably by welding. Valve packing material 13 is placed in the annular space between the valve stem and the cylindrical surface of the valve stem opening. A washer 14 is placed around the valve stem and over the packing material and is held in place and urged toward the fixed washer 12 by packing nut 15. The force generated on the packing material by tightening the nut urges the packing material inward against the valve stem and the outward against the inner surface of the valve stem opening sealingly engaging both. It will be appreciated that the valve stem packing is a secondary seal, the valve plug/valve chamber interface being the primary seal.

The cover plate and spring assembly 20 seal the valve, provide retention of the valve plug in the valve chamber and provide, sealing pressure between the surfaces of the valve plug and the valve chamber. The cover plate 21 is essentially cylindrical in shape, having a cylindrical depression 22 in one side. The diameter of the cylindrical depression is greater than the wide end of the valve plug. Within the depression 22 a retainer ring 23 is fixedly attached to the coverplate 21. A second retainer ring 24 is fixedly attached to the bottom of the valve plug. Together said retainer rings 23 and 24 retain spring 25 in a position to provide a sealing force on the valve plug 8 in the direction of the axis of the plug.

The cover plate 21 is held in position against the valve body 1 by bolts (not shown) through mating holes 29 in flanges 26 (shown in FIG. 1b) positioned and circumferentially spaced about the cover plate and valve body. As seen more clearly in the plan view of FIG. 1b, the valve body 1 has a cylindrical groove 27 concentric with the valve chamber in its lower face. An elastomeric o-ring type seal 28 is placed in the groove to provide a seal between the valve body and the cover plate. It will be recognized that this o-ring seal is a secondary seal, again the interface between the valve plug and valve chamber being the primary seal.

According to the present invention, the novel shape of the valve plug and valve chamber is that of a pseudosphere described above as the body of rotation of a tractrix.

A tractrix is defined as a curve wherein the distance, measured along a tangent to the curve, between the y axis and the point of tangency has a constant value "a" for all values of x between "O" and "a".

Mathematically, this curve is defined by the following equation:

$$y = a\left[\cosh^{-1}\frac{a}{x}\right] - \sqrt{a^2 - x^2}$$

Figure 2:
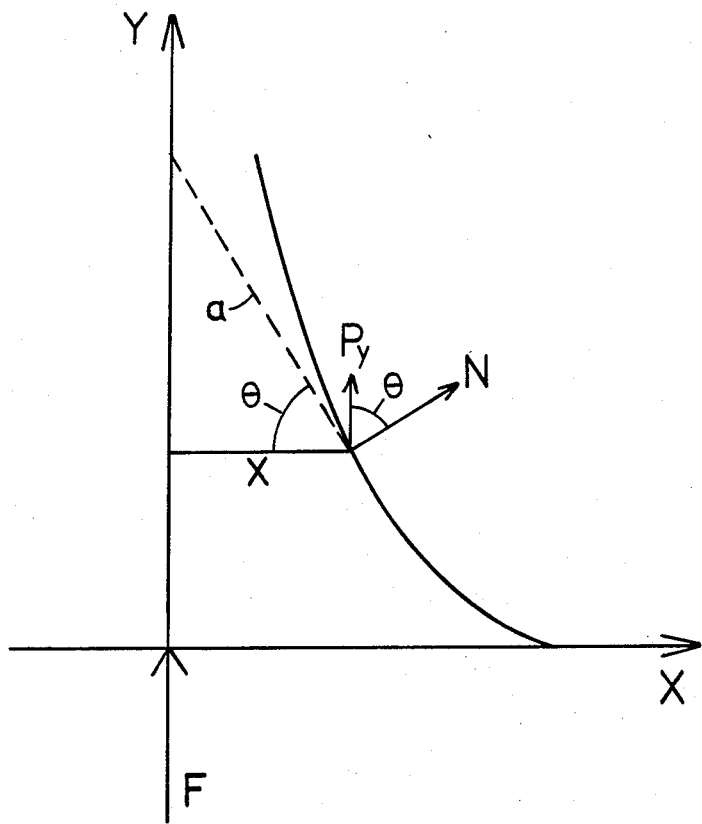
FIG. 2 is a graph of a tractrix curve which forms the basis of the novel shape of the valve plug in the present invention.

FIG. 2 is a plot of this curve. In FIG. 2, the depicted vector $P_y$ is the y-component of the vector N which represents the normal pressure between the valve plug 8 and the surface of the valve body defining the valve chamber 6. $P_y$ is assumed to be constant and has a value $$P_y = F/A$$

where F is the force provided by spring 25 and A is the horizontal projection of the area of contact between the valve plug 8 and the valve body 1. Both F and A are constants. N must then have a value $$N = \frac{P_y}{\cos\theta}$$

but $\cos\theta = \frac{x}{a}$ and $P_y = \frac{F}{A}$ so, $$N = \frac{Fa}{Ax}$$

The wear that occurs due to the friction between the mating surfaces of the valve plug 8 and the valve body 1 will be proportional to the work per unit area done against the friction when the valve plug 8 is rotated.

If W is the work per unit area per revolution then $$W = \mu N(2\pi x)$$

where $\mu$ is the coefficient of friction, N is the normal pressure as above and $2\pi x$ is the circumference of the valve plug at x.

Substituting the expression for N obtained above yields:

$$W = \frac{2\pi \mu Fa}{A}$$

where each term is a constant, therefore the work per revolution and hence the frictional wear will be constant along the entire surface of the valve plug. Since the wear is constant, the efficacy of the hydraulic seal between the valve plug and the valve body will not be affected by moderate wear and the valve will need little maintenance and will have a long life.

It will be recognized that the form of the valve plug/valve chamber can be taken from any section along the curve. For example, one could select a section of the curve near the origin or one could select a portion further up along the y-axis. In this case, the plug will more closely resemble a cone. The specifically disclosed curve must be adhered to, however, so the even wear feature is retained. The value of the constant "a" may be varied to create various plug shapes for different sized valves in various applications.

While the invention is described in connection with a particular preferred embodiment, it will be understood that it is not limited to this embodiment but is intended to encompass all alternatives, modifications and equivalents which may be properly included within the spirit and scope of the invention as defined in the appended claims.

The embodiments of this invention is which an exclusive property or privilege is claimed are defined as follows:

1. An improved plug valve including a valve body having an inlet passage and an outlet passage therethrough, a valve chamber between said inlet and outlet passages, a valve plug having substantially the same shape as said valve chamber and being rotatably disposed therein, said valve plug having a flow passage therethrough, said flow passage disposed such that with said valve plug in a first position, said flow passage is in alignment with said inlet and said outlet passages and provides fluid communication therebetween, and with said valve plug in a second position, said flow passage is not in alignment with said inlet and outlet passages and said valve plug interrupts fluid communication therebetween; and means for rotating said valve plug between said first position and said second position; wherein the improvement comprises:
   said valve plug and said valve chamber having the shape of a pseudosphere.
2. The improved plug valve of claim 1 further including:
   means for providing sealing pressure between said valve plug and said valve body.
3. The improved plug valve of claim 1 wherein
   said valve body is further characterized as having a valve stem opening extending from said valve chamber and co-axial therewith; and
   said means for rotating said valve plug comprises a valve stem connected to said valve plug and extending through said valve stem opening.
4. The improved plug valve of claim 2 wherein
   said valve body is further characterized as having a valve stem opening extending from said valve chamber and co-axial therewith; and
   said means for rotating said valve plug comprises a valve stem connected to said valve plug and extending through said valve stem opening.

* * * * *